Oct. 8, 1935.  S. G. RAYL  2,016,293
STOP AND TURN SIGNAL DEVICE
Filed Sept. 17, 1929
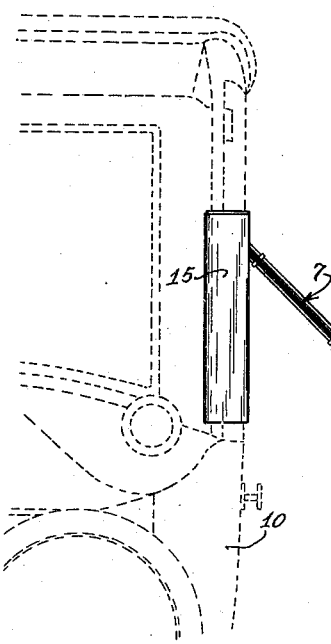
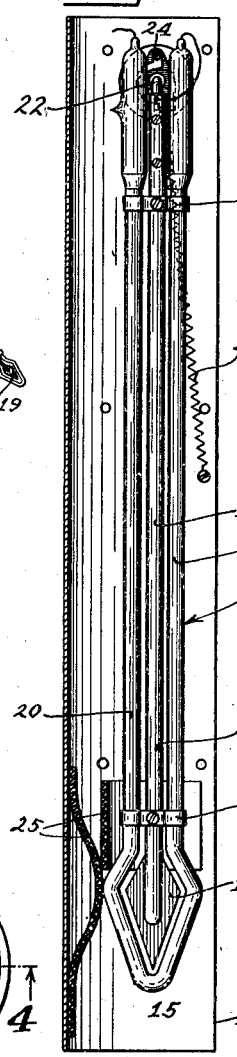
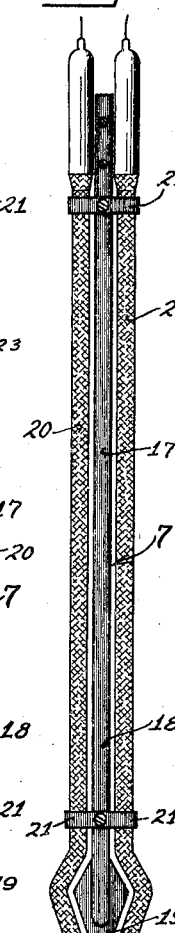
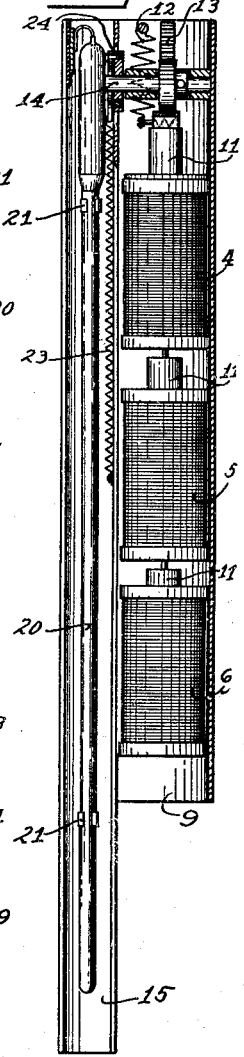
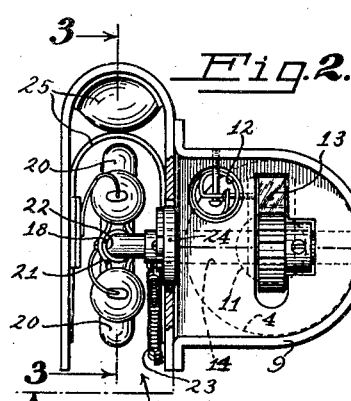
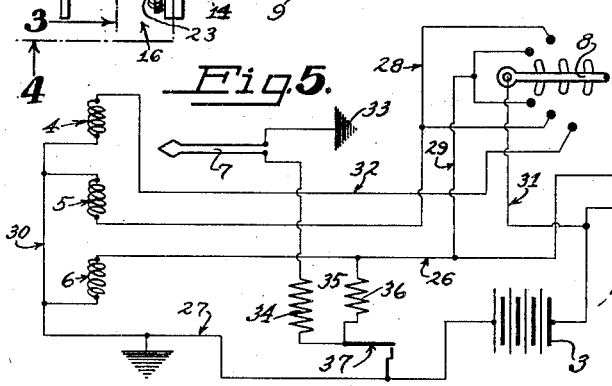
INVENTOR.
Stanley G. Rayl Patented Oct. 8, 1935

2,016,293

UNITED STATES PATENT OFFICE 2,016,293

STOP AND TURN SIGNAL DEVICE

Stanley G. Rayl, Oakland, Calif.

Application September 17, 1929, Serial No. 393,141

3 Claims. (Cl. 177—311)

This invention relates to a signal system for vehicles for indicating, mechanically and automatically, the universally adopted arm or hand signals.

The invention has for its objects to provide a movable signal member which is set manually and released automatically with the steering of the vehicle to indicate its turning to the right or left, and which signal member also automatically operates on the application of the brakes to indicate a stop. Another object is to provide a novel form of indicator adapted for day time use, or illumination for night use, and wherein the illuminating element is constructed and reinforced in a novel manner. A further object is to provide a novel form of electric controlling circuit for the indicator.

With the above mentioned and other objects in view, the invention consists in the novel construction and combination of parts hereinafter described, illustrated in the accompanying drawing and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawing, wherein—

Fig. 1 is a view in elevation of my signal mounted on a vehicle.

Fig. 2 is a view in top plan illustrating the casing and the arrangement of parts therein.

Fig. 3 is a vertical sectional view on line 3—3 Fig. 2.

Fig. 4 is a section on line 4—4 Fig. 2.

Fig. 5 is a view in plan of the wiring diagram.

Fig. 6 is a view in elevation of the indicator, illustrating the central supporting frame and lamp structure surrounding the same.

Referring particularly to the wiring diagram, Fig. 5, I indicates the movable portion of a brake mechanism; 2 a switch mechanism; 3 a battery; 4, 5, and 6 solenoids; 7 an indicator in the form of an arrow and 8 a switch mechanism set manualy and released with the steering of the vehicle.

Within a vertically disposed tubular barrel 9, secured in a convenient place, preferably at the left front of a vehicle 10, are the solenoids 4, 5, and 6, the cores 11 of which are interconnected. The cores are normally raised by a spring 12 and upwardly from the upper core extends a rack 13 intermeshing with a pinion shaft 14 disposed transversely of the barrel 9 and extending into a vertically disposed flat shell 15 open at its outer edge, as at 16.

Within the shell is mounted the indicator 7 in the form of an arrow. The indicator is constructed with a central frame member 17 having a tubular rod or body 18 and mounting at its end a relatively flat arrow point 19.

Outlining the body 18 and point 19 at opposite sides and slightly spaced therefrom is a tubular lamp structure 20, preferably of the gas filled (neon, etc.) type for electrical energization. Complementary clamping members 21 detachably secured to the body 18, grip the lamp structure at points on opposite sides of the body 18, and mount the parts as a unit. Into the upper end of body 18 extends the curved end 22 of shaft 14, affording a mounting for the indicator. A spring 23 anchored at one end and connected at its other with a plate 24 on shaft 14 assists the solenoids in operating the indicator. Suitable buffers 25 within the member 15 afford a yielding stop and abutment for the indicator when it is concealed within said member.

With the parts assembled as illustrated and constructed as described, the device operates in the following manner:—

The vehicle operator depressing pedal 1 completes a circuit through switch 2, lead 26, solenoid 6, lead 27 and battery 3. This operation moves the stop solenoid core 11 a quarter of an inch, causing the arrow to swing outwardly from the shell to an angle of 45°. With the pressure on the brake released, the parts return to normal position. In turning to the left, the switch 8 is set manually to complete the circuit through lead 28 with solenoid 5 through the lead 29 to lead 26 to solenoid 6 connected with the other leads by lead 30, and through lead 31 to battery 3. This circuit energizes the cores 11 of solenoids 5 and 6 and swings arrow outwardly from its shell at an angle of 90°. After this left turn has been completed, a dog on the steering wheel (not shown) trips the switch and restores it to its center position. When a right turn is made, the switch 8 is set manually to make the above circuit and in addition thereto energizes solenoid 4 through lead 32. Thus with all cores 11 energized, the arrow swings outwardly to an angle of 135°.

To energize the tube 20, one electrode is grounded at 33 and the other electrode is connected to one winding 34 of a booster coil 35, the other winding 36 of which connects with lead 26.

A switch 37 controls the energizing current flow from the battery 3 through the coil.

It is preferable that the tubular lamp structure 20 be amber color and that arrow 18 be red, these colors having been determined to be the best combination for day and night signalling.

I claim:—

1. A signal device comprising an arrow shaped indicator consisting of an elongated shaft and a flattened head at one end, a gas filled tubular lamp structure outlining the shaft and head at opposite sides in a plane parallel with that of the head, and clamping members disposed transversely of the shaft and engaging said lamp structure on opposite sides thereof.

2. A signal device comprising an arrow shaped indicator consisting of an elongated shaft and a flat head at one end, a gas filled tubular lamp structure outlining the shaft and head at opposite sides and in spaced relation thereto, and means for detachably securing the lamp structure to the shaft at a plurality of points within its length.

3. In a motion and direction signal for use on a vehicle, an elongated semaphore arm in the form of a pointer and comprising a cylindrical shaft terminating in a flattened head, a luminescent tube outlining the arm in the plane of the head, and clamp members extending radially from the shaft and engaging the tube for securing the same in fixed relation to the arm.

STANLEY G. RAYL.